United States Patent
Wang et al.

(10) Patent No.: US 10,331,685 B2
(45) Date of Patent: Jun. 25, 2019

(54) METHOD AND APPARATUS FOR SORTING RELATED SEARCHES

(71) Applicant: BAIDU ONLINE NETWORK TECHNOLOGY (BEIJING) CO., LTD., Beijing (CN)

(72) Inventors: Wei Wang, Beijing (CN); Jia Gui, Beijing (CN); Jun Cheng, Beijing (CN); Kuipeng Wang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 103 days.

(21) Appl. No.: 15/625,936

(22) Filed: Jun. 16, 2017

(65) Prior Publication Data
US 2018/0189291 A1 Jul. 5, 2018

(30) Foreign Application Priority Data
Dec. 29, 2016 (CN) .......................... 2016 1 1244559

(51) Int. Cl.
*G06F 7/08* (2006.01)
*G06F 16/2457* (2019.01)

(52) U.S. Cl.
CPC .......... *G06F 16/24578* (2019.01); *G06F 7/08* (2013.01)

(58) Field of Classification Search
CPC ... G06F 17/3053; G06F 16/24578; G06F 7/08
See application file for complete search history.

(56) References Cited

U.S. PATENT DOCUMENTS

| | | | | |
|---|---|---|---|---|
| 7,827,170 | B1* | 11/2010 | Horling | G06F 17/30867 707/722 |
| 2010/0082421 | A1* | 4/2010 | Tuladhar | G06Q 10/04 705/14.41 |
| 2011/0246285 | A1* | 10/2011 | Ratnaparkhi | G06Q 30/00 705/14.42 |
| 2012/0023043 | A1* | 1/2012 | Cetin | G06N 7/005 706/12 |

(Continued)

FOREIGN PATENT DOCUMENTS

| CN | 103678668 A | 3/2014 |
|---|---|---|
| CN | 103984705 A | 8/2014 |

(Continued)

OTHER PUBLICATIONS

From CN App. No. 201611244559.4, First Office Action with Search Report, dated Jan. 11, 2018, with machine English translation provided by Google Translate.

(Continued)

*Primary Examiner* — Cam Y T Truong
(74) *Attorney, Agent, or Firm* — Ladas & Parry, LLP (57) ABSTRACT

The present disclosure provides a method and apparatus for sorting related searches RS, wherein the method comprises: obtaining a query and obtaining RSes corresponding to the query; determining estimated click rates of the RSes respectively according to a click estimating model obtained from pre-training; sorting the RSes in a descending order according to the estimated click rates. The solutions of the present disclosure can improve the accuracy of the sorting results.

12 Claims, 2 Drawing Sheets

(56) References Cited

U.S. PATENT DOCUMENTS

| | | | |
|---|---|---|---|
| 2013/0246383 A1* | 9/2013 | White | G06F 17/30867 |
| | | | 707/706 |
| 2014/0012840 A1* | 1/2014 | Han | G06F 17/30554 |
| | | | 707/723 |
| 2014/0040302 A1 | 2/2014 | Walsh | |
| 2016/0055252 A1* | 2/2016 | Makeev | G06F 17/3053 |
| | | | 707/733 |
| 2017/0329782 A1 | 11/2017 | Gui et al. | |

FOREIGN PATENT DOCUMENTS

| | | |
|---|---|---|
| CN | 104143005 A | 11/2014 |
| CN | 105117491 A | 12/2015 |
| CN | 105159930 A | 12/2015 |
| CN | 106021374 A | 10/2016 |

OTHER PUBLICATIONS

Rajput et al., "User Rating and Synonyms Based modified Ranking Technique for Recommender Systems", 2015 International Conference on Computational Intelligence and Communication Networks, pp. 989-992.

Lee et al., "Analysis and application of Baidu related Search Function", Intelligence Exploration, Issue 8, Aug. 2011, pp. 99-101.

* cited by examiner

METHOD AND APPARATUS FOR SORTING RELATED SEARCHES

The present application claims the priority of Chinese Patent Application No. 201611244559.4, filed on Dec. 29, 2016, with the title of "Method and apparatus for sorting related searches", the entire disclosure of which is hereby incorporated by reference in its entirety.

FIELD OF THE DISCLOSURE

The present disclosure relates to Internet technologies, and particularly to a method and apparatus for sorting relevant searches.

BACKGROUND OF THE DISCLOSURE

At present, when a user performs an operation such as image search, it is usual to recommend/display related searches (RS) related to the user-input query to the user in a search result page.

The image search refers to a service of providing relevant image materials on the Internet to the user through a search program, and aims to look up specific images needed by the user himself.

For example, recommended RSes may be displayed below a search box in the search result page. The RSes come from a set of queries by which all users once searched and are used to mine users' points of interest and thereby boost user traffic of business search engines.

Relevancy of RSes exerts a direct impact on the user's click. The higher the relevancy is, the larger a possibility of user click is, and correspondingly, the larger the user traffic is.

In the prior art, after RSes to be selected are obtained, it is usual to sort the RSes according to a predetermined rule, and display top N RSes after the sorting to the user, wherein the N is a positive integer and usually larger than 1.

However, only coarse sorting can be performed for RSes in the above manner, that is, the accuracy of the sorting result is undesirable. As a result, what are displayed to the user are probably some unrelated RSes and thereby possibility of the user click is reduced.

SUMMARY OF THE DISCLOSURE

In view of the above, the present disclosure provides a method and apparatus for sorting related searches, which can improve the accuracy of the sorting results.

Specific technical solutions are presented as follows:

A method of sorting related searches comprises:

obtaining a query and obtaining RSes corresponding to the query;

determining estimated click rates of the RSes respectively according to a click estimating model obtained from pre-training;

sorting the RSes in a descending order according to the estimated click rates.

An apparatus of sorting related searches, comprising a recall unit and a sorting unit;

the recall unit is configured to obtain a query, obtain RSes corresponding to the query, and send the RSes to the sorting unit;

the sorting unit is configured to determine estimated click rates of the RSes respectively according to a click estimating model obtained from pre-training, and sort the RSes in a descending order according to the estimated click rates.

As can be seen from the above introduction, the solutions of the present disclosure may be employed to, as for each RS, first determining estimated click rates of the RSes respectively according to the click estimating model obtained from pre-training, and sort the RSes in a descending order according to the estimated click rates, to thereby improve the accuracy of the sorting results as compared with the prior art.

DETAILED DESCRIPTION OF PREFERRED EMBODIMENTS

To make technical solutions of the present disclosure clearer and more apparent, the technical solutions of the present disclosure will be further described in detail by referring to figures and presenting embodiments.

Figure 1:
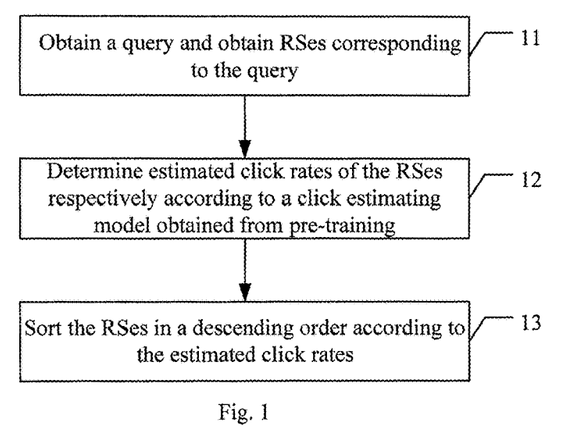
FIG. 1 is a flow chart of an embodiment of a method of sorting related searches according to the present disclosure.

FIG. 1 is a flow chart of an embodiment of a method of sorting related searches according to the present disclosure. As shown in FIG. 1, the embodiment comprises the following specific implementation modes.

At 11, a query is obtained, and RSes corresponding to the query are obtained.

How to obtain the RSes corresponding to the query, namely, RSes to be selected, is of the prior art.

At 12, estimated click rates of the RSes are respectively determined according to a click estimating model obtained from pre-training.

In practical application, it is feasible to use a collected training sample in advance to train to obtain a click estimating model. As such, it is feasible, for each RS, obtain a user behavior feature of the RS, and thereby consider the obtained feature as input of the click estimating model to obtain the estimated click rate of the RS output by the click estimating model.

Specific content included in the user behavior feature may depend on actual needs, for example, it may comprise: co-occurrence feature, quality control feature, click feature and semantic feature. The features will be introduced respectively in detail by taking the following image-searching scenario as an example.

1) Co-Occurrence Feature

The co-occurrence feature describes relationship between sets of query searched by the user, within one session of the user. The co-occurrence feature may have two dimensions: co-occurrence times and relationship of anterior and posterior co-occurrences.

The co-occurrence times: a co-occurrence frequency of non-sequenced <queryA, queryB> in querylists of all sessions within a recent predetermined time length; as for each RS corresponding to the query in 11, statistics may be performed for the co-occurrence frequency of non-sequenced <query(namely, the query in 11), RS> in querylists of all sessions within a recent predetermined time length.

The relationship of anterior and posterior co-occurrences: it differs from the co-occurrence times in that the sequence of the two queries in <queryA, queryB> needs to be taken into account when statistics is performed; two statistics results may be obtained correspondingly according to the difference of the sequence of the two queries.

A specific value of the recent predetermined time length may depend on actual needs, e.g., recent M days, wherein M is usually a positive integer greater than 1.

2) Quality Control Feature

The quality control feature may have three dimensions: query search times, large-picture page turning times, and the number of obj of the clicked pictures.

Query search times: a frequency of all users searching for the query within the recent predetermined time length.

Large-picture page turning times: an average value of large-picture page turning times of all user under the query within the recent predetermined time length. For example, the user inputs the query to search, and a search result page will display reduced images as search results. When the user clicks any reduced picture, a large picture corresponding to the reduced image will be displayed, namely, the large picture is displayed. Furthermore, the user turns pages from the left or right to view other large pictures. When the page is turned each time, the statistics result may be added one to obtain the large-picture page turning times during the user's search of this time.

The number of obj of the clicked pictures: an average value of times of all users clicking reduced pictures in the query search result page within the recent predetermined time length. For example, the user inputs the query to search, and the search result page will display reduced images as search results. When the user clicks any reduced picture, the statistics result may be added one to obtain the times of the user clicking the reduced images during the user's search of this time.

In the present embodiment, as for each RS corresponding to the query in 11, the quality control features of the RS and the corresponding query may be obtained respectively. As for any RS, if the user clicks the RS, search is performed by taking the RS as the query.

Likewise, a specific value of the recent predetermined time length may depend on actual needs.

3) Click Feature

The click feature may have four dimensions: general click feature, single-day click rate, 30-day click rate and 60-day click rate, wherein the click rate=click times/display times.

How to obtain the general click feature is of the prior art.

The single-day click rate: the click times means times of clicking pair<query, RS> formed by clicking RSes after all users search for the query within the recent one day, and the display times means times of displaying pair<query, RS> formed by displaying RSes after all users search for the query within the recent one day; the single-day click rate may be obtained by dividing the click times obtained from the statistics by the display times.

For example, as for the query in 11, assume that one RS corresponding to it is RSx, statistics is performed for times of clicking pair<query, RSx> formed by clicking RSx after search is performed for the query within the recent one day, namely, the click times, and statistics is performed for times of displaying pair<query, RSx> formed by displaying RSx after search is performed for the query within the recent one day, namely, the display times. The single-day click rate of the RSx may be obtained by dividing the click times by the display times.

The definition of 30-day click rate and 60-day click rate is similar to the single-day click rate, and the only thing is that "recent one day" is replaced with "recent 30 days" and "recent 60 days" respectively.

4) Semantic Feature

The sematic feature may have two dimensions: basic_weight and semantic_sim.

The basic_weight: a proportion of a length of a term co-occurring in the query and the RS to the length of the RS.

The semantic_sim: similarity probability of the query and the RS. How to calculate it is of the prior art.

Regarding each RS corresponding to the query in 11, it is feasible to obtain the above features respectively and input them to the click estimating model to obtain an estimated click rate of the RS output by the click estimating model.

Furthermore, it is possible to consider the feature and the estimated click rate of each RS as a new training sample, and use the obtained multiple new training samples to optimize the click estimating model.

How to use the training sample to train and optimize the click estimating model is of the prior art.

In 13, the RSes are sorted in a descending order according to the estimated click rate.

After the estimated click rates of all RSes corresponding to the query in 11 are obtained respectively, the RSes may be sorted in a descending order according to the estimated click rates.

Furthermore, top N RSes after the sorting may be displayed in the search result page, i.e., recommended to the user.

As can be seen from the above, the solution of the above embodiment may be used to, as for all RS, first determine the estimated click rates of all RSes according to the pre-trained click estimating model, and then sort the RSes according to the magnitude of the estimated click rates, and thereby improve the accuracy of the sorting results as compared with the prior art; furthermore, the model may be considered as a sorting policy framework, the used features may be considered as personalized customization of the sorting policy, and the model features may be flexibly selected or adjusted according to actual needs to facilitate performance of policy upgrading.

A training target of the click estimating model is to boost the click rate of one-time search. To further improve a guiding capability, a secondary click rate, namely, a guiding capability feature may be introduced. After the user searches for the query and clicks the RS, a sum of click rates at all positions for performing further RS clicks under the RS is called the secondary click rate. The feature may be mined by performing statistics of the user's sessions.

Correspondingly, in the solution of the present embodiment, after the estimated click rates of all RSes are determined respectively, it is feasible to further determine guiding capability scores of all RSes respectively according to the estimated click rates of the RSes and the guiding capacity features, and thereby sort the RSes in a descending order according to the guiding capability scores.

To obtain the guiding capability score, the following processing is performed respectively for each RS:

respectively obtaining click times of RSes further displayed within the recent predetermined time length after the user clicks the RS, adding up the click times, dividing the sum by times of further displaying RSes within the recent predetermined time length after the RS is clicked, to obtain the guiding capability feature of the RS;

obtaining the click rate of the RS within the recent predetermined time length;

calculating a product of the guiding capability feature of the RS and the click rate of the RS within the recent predetermined time length, and adding up the product with the estimated click rate of the RS after having gone through normalization processing to obtain the guiding capability score of the RS.

Assume that after the user inputs the query in 11 and performs search, he clicks one RS, e.g., RSx displayed in the search result page, and assume that the number of next-level RSes displayed after the RSx is clicked is 10, for the 10 RSes, the click times thereof within the recent predetermined time length may be obtained respectively, for example, respectively obtain the click times within 30 days, add up the click times of the 10 RSes within 30 days, divide the sum by times of displaying next-level RSes after the RSx is clicked within the recent predetermined time length, to obtain the guiding capability feature of the RSx.

Upon performing statistics of the click times and display times as stated above, any of the following processing manners may be employed: the RSx must come from the query in 11, i.e., the user uses the query in 11 to perform search and then displays and clicks the RSx, or the RSx may come from any query, namely, the user uses any query to perform search and then displays and clicks the RSx.

Regarding the above RSx, after its guiding capability feature is obtained, it is further necessary to obtain its click rate within the recent predetermined time length, e.g., the click rate within 30 days, then calculate a product of the guiding capability feature of the RSx and the click rate of the RSx within the recent predetermined time length, and add up the product with the estimated click rate of the RSx after having gone through normalization processing to obtain the guiding capability score of the RSx.

Namely, score=pre_result+$ctr$*daoliu;

Wherein the score indicates the guiding capability score, the pre_result indicates the estimated click rate, the ctr indicates the click rate within 30 days, and the daoliu indicates the guiding capability feature.

To make the two items that are added up comparable, it is necessary to normalize the pre_result to a section (0, $ctr_{max}$], wherein $ctr_{max}$ indicates a maximum value in the click rates of RSes corresponding to the query in 11 within 30 days.

Especially, as for any RS corresponding to the query in 11, if the RS is RS not displayed before, since it does not have information such as historical click behaviors, the pre_result may be regarded as the ctr of the RS, and an average value of daoliu of already-displayed RSes corresponding to the query in 11 may be considered as the daoliu of the RS when the score of the RS is calculated.

A drawback of the click estimating model is as follows: as for a long-tail query whose click behaviors are not rich enough, too few historical click behaviors cause the scoring of the model not accurate enough; although the model introduces the quality control feature, since what is used upon training is the user's real click data, and the user, upon clicking, does not know whether the result quality of the clicked RS can meet his own needs, the quality control feature has a limited function in the click estimating model and cannot be put in full play.

To this end, the solution of the present embodiment proposes that it is further feasible to respectively determine quality scores of RSes according to quality features of RSes, and then sort the RSes by comprehensively considering the guiding capability scores and quality scores of the RSes, or sort the RSes by comprehensively considering the estimated click rates and quality scores of the RSes.

Specifically, it is feasible to, as for each RS, determine the quality score of the RS in a fitting manner respectively according to the quality control feature, guiding capability feature and estimated click rate of the RS.

Introduction of the guiding capability feature and estimated click rate into the quality feature is mainly intended to control relevancy.

The quality control feature may comprise the aforesaid query search times, large-picture page turning times, and the number of obj of the clicked pictures.

As such, as for each RS corresponding to the query in 11, it is feasible to determine the quality score of the RS in a fitting manner respectively according to the query search times, large-picture page turning times, and the number of obj of the clicked pictures, the guiding capability feature and estimated click rate of the RS. A specific fitting manner is of the prior art.

Then, sorting the RSes by comprehensively considering the guiding capability scores and quality scores of the RSes comprises:

sorting the RSes in a descending order according to the guiding capability scores;

sorting the RSes in a descending order according to the quality scores;

as for each RS, respectively obtaining sorting positions of the RS in the sorting of the two times and calculating an average value of the two sorting positions;

sorting the RSes according to the average values of the sorting positions of the RSes.

For example, there exist a total of 10 RSes. Assume that one RS of the 10 RSes is RSx, the RSx ranks the third when the RSes are sorted according to the guiding capability scores, the RSx ranks the fourth when the RSes are sorted according to the quality scores, and then the average value of the RSx is 3.5; as for another RS which assumed as RSz, the RSz ranks the second when the RSes are sorted according to the guiding capability scores, the RSz ranks the third when the RSes are sorted according to the quality scores, and then the average value of the sorting position of the RSz is 2.5. 2.5 is smaller than 3.5. Therefore, the RSz ranks before the RSx. If the averages values of the sorting positions of the RSx and RXz are the same, RSz may rank before the RSx, or vice versa.

Or, sorting the RSes by comprehensively considering the estimated click rates and the quality scores of the RSes comprises:

sorting the RSes in a descending order according to the estimated click rates;

sorting the RSes in a descending order according to the quality scores;

as for each RS, respectively obtaining sorting positions of the RS in the sorting of the two times and calculating an average value of the two sorting positions;

sorting the RSes according to the average values of the sorting positions of the RSes.

As known from the above introduction, in the solution of the present embodiment, the following four manners may be at least employed to sort the RSes corresponding to the query in 11:

1) sorting the RSes in a descending order according to the estimated click rates;

2) sorting the RSes in a descending order according to the guiding capability scores;

3) sorting the RSes by comprehensively considering the guiding capability scores and quality scores of the RSes;

4) sorting the RSes by comprehensively considering the estimated click rates and quality scores of the RSes.

In whichever manner, after RSes are sorted, top N RSes after the sorting may be displayed in the search result page and recommended to the user.

The above manner 3) is taken as an example to further describe the solution of the present disclosure.

Figure 2:
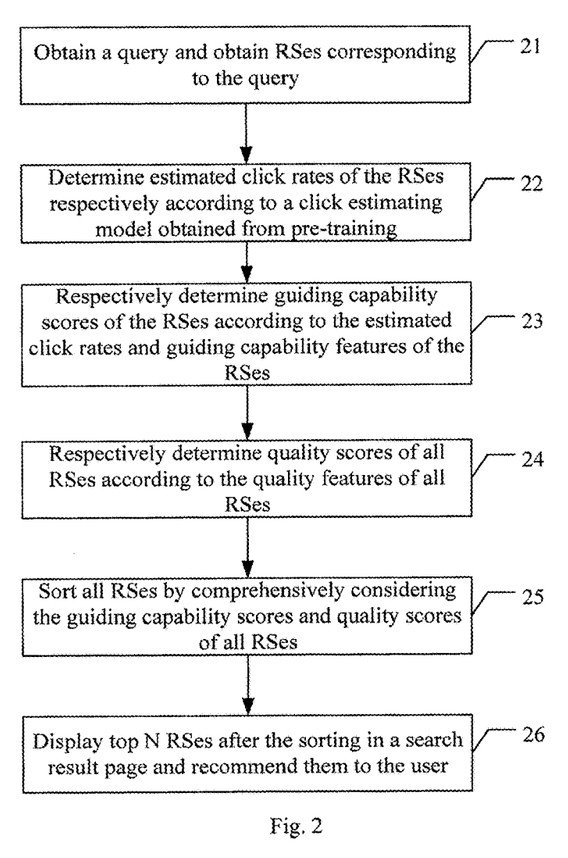
FIG. 2 is a flow chart of a preferred embodiment of a method of sorting related searches according to the present disclosure.

FIG. 2 is a flow chart of a preferred embodiment of a method of sorting related searches according to the present disclosure. As shown in FIG. 2, the embodiment comprises the following specific implementation modes.

At 21, a query is obtained, and RSes corresponding to the query are obtained.

At 22, estimated click rates of the RSes are respectively determined according to a click estimating model obtained from pre-training.

At 23, guiding capability scores of the RSes are determined respectively according to the estimated click rates and guiding capability features of the RSes.

At 24, the quality scores of all RSes are determined respectively according to the quality features of all RSes.

At 25, all RSes are sorted by comprehensively considering the guiding capability scores and quality scores of all RSes.

At 26, top N RSes after the sorting may be displayed in the search result page and recommended to the user.

Figure 3:
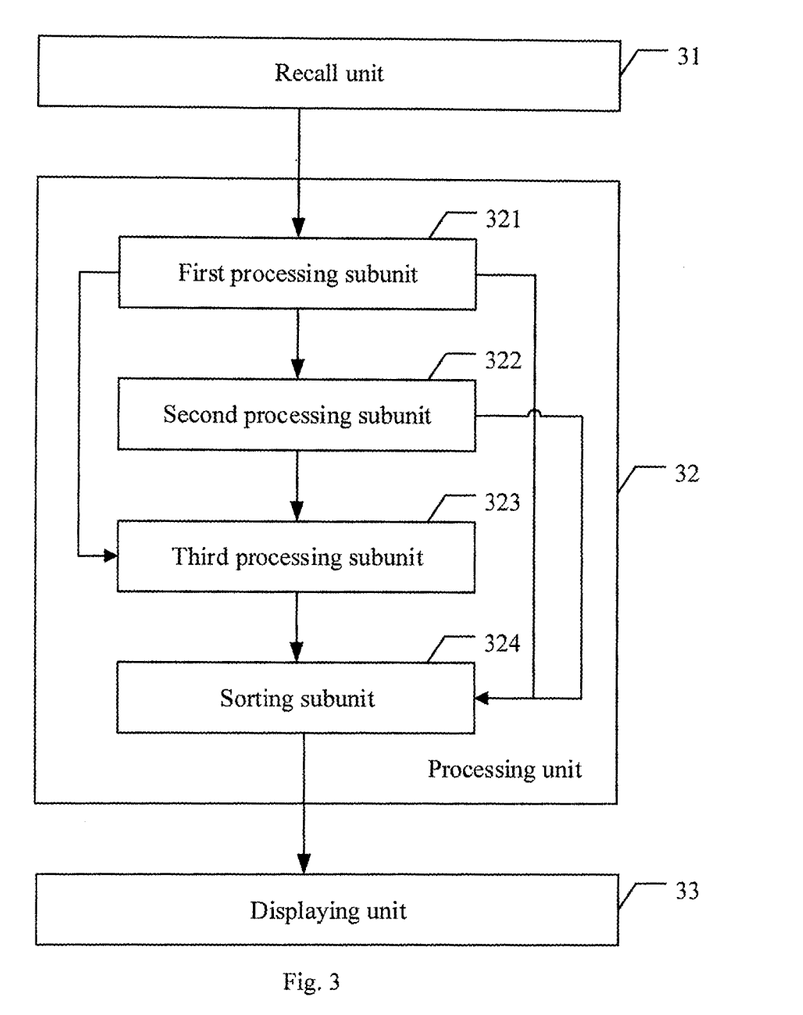
FIG. 3 is a block diagram of an embodiment of an apparatus of sorting related searches according to the present disclosure.

FIG. 3 is a block diagram of an embodiment of an apparatus of sorting related searches according to the present disclosure. As shown in FIG. 3, the apparatus comprises a recall unit 31 and a sorting unit 32.

The recall unit 31 is configured to obtain a query, obtain RSes corresponding to the query, and send the RSes to the sorting unit 32.

The sorting unit 32 is configured to determine estimated click rates of the RSes respectively according to a click estimating model obtained from pre-training, and sort the RSes in a descending order according to the estimated click rates.

Wherein, the sorting unit 32 may comprise a first processing subunit 321 and a sorting subunit 324.

The first processing subunit 321 is configured to, for each RS, obtain a user behavior feature of the RS, consider the obtained feature as input of the click estimating model to obtain the estimated click rate of the RS output by the click estimating model, and send it to the sorting subunit 324.

Correspondingly, the sorting subunit 324 may sort the RSes in a descending order according to the estimated click rates.

The user behavior feature may comprise: co-occurrence feature, quality control feature, click feature and semantic feature.

Wherein, the co-occurrence feature may comprise co-occurrence times and relationship of anterior and posterior co-occurrences.

The quality control feature may comprise: query search times, large-picture page turning times, and the number of obj of the clicked pictures.

The click feature may comprise: general click feature, single-day click rate, 30-day click rate and 60-day click rate.

The sematic feature may comprise: basic_weight and semantic_sim.

As shown in FIG. 3, the sorting unit 32 may further comprise a second processing subunit 322.

The first processing subunit 321 may further send the estimated click rates of the RSes to the second processing subunit 322.

Correspondingly, the second processing subunit 322 may respectively determine the guiding capability scores of RSes according to the estimated click rates and guiding capability features of the RSes, and send them to the sorting subunit 324.

The sorting subunit 324 may sort all RSes in a descending order according to the guiding capability scores.

Specifically, the second processing subunit 322 may perform the following processing for each RS:

respectively obtaining click times of RSes further displayed within the recent predetermined time length after the user clicks the RS, adding up the click times, dividing the sum by times of further displaying RSes within the recent predetermined time length after the RS is clicked, to obtain the guiding capability feature of the RS;

obtaining the click rate of the RS within the recent predetermined time length;

calculating a product of the guiding capability feature of the RS and the click rate of the RS within the recent predetermined time length, and adding up the product with the estimated click rate of the RS after having gone through normalization processing to obtain the guiding capability score of the RS.

As shown in FIG. 3, the sorting unit 32 may further comprise a third processing subunit 323.

The third processing subunit 323 may respectively determine quality scores of RSes according to quality features of RSes, and send them to the sorting subunit 324.

The sorting subunit 324 may sort the RSes by comprehensively considering the guiding capability scores and quality scores of the RSes.

Correspondingly, the first processing subunit 321 may further send the estimated click rates and quality control features of all RSes to the third processing subunit 323.

The second processing subunit 323 may further send the guiding capability features of all RSes to the third processing subunit 323.

The third processing subunit 323 may, as for each RS, determine the quality score of the RS in a fitting manner respectively according to the quality control feature, guiding capability feature and estimated click rate of the RS.

Wherein, upon sorting all RSes by comprehensively considering the guiding capability features and quality scores of all RSes, the sorting subunit 324 may sort the RSes in a descending order according to the guiding capability scores, sort the RSes in a descending order according to the quality scores, and as for each RS, respectively obtain sorting positions of the RS in the sorting of the two times and calculate an average value of the two sorting positions, and sort the RSes according to the average values of the sorting positions of the RSes.

The sorting subunit 324 may further sort the RSes by comprehensively considering the estimated click rates and quality scores of the RSes, namely, sort the RSes in a descending order according to the estimated click rates, sort the RSes in a descending order according to the quality scores, and as for each RS, respectively obtain sorting positions of the RS in the sorting of the two times and calculate an average value of the two sorting positions, and sort the RSes according to the average values of the sorting positions of the RSes.

As known from the above introduction, in the solution of the present embodiment, the sorting subunit 324 may at least employ the following four manners:

1) sorting the RSes in a descending order according to the estimated click rates;

2) sorting the RSes in a descending order according to the guiding capability scores;

3) sorting the RSes by comprehensively considering the guiding capability scores and quality scores of the RSes;

4) sorting the RSes by comprehensively considering the estimated click rates and quality scores of the RSes.

As shown in FIG. 3, the apparatus embodiment shown in FIG. 3 may further comprises a displaying unit 33.

The sorting unit 32 may send top N RSes after the sorting to the displaying unit 33, and correspondingly, the displaying unit 33 may display top N RSes after the sorting in the search result page and recommend them to the user.

Reference may be made to corresponding depictions in the above method embodiment for a specific workflow of the apparatus embodiment shown in FIG. 3, and the workflow is not detailed any more.

To sum up, the solutions of the present disclosure may be employed to improve the accuracy of the sorting results and adapted for all vertical type or general search engine systems, and exhibit broad applicability.

The above method and apparatus provided by the embodiments of the present disclosure may be embodied by computer programs which are set and run in equipment. The equipment may comprise one or more processors as well as a memory and one or more programs, wherein the one or more programs are stored in the memory and executed by said one or more processors to implement steps of the method and/or operations of the apparatus as illustrated in the above embodiments of the present disclosure.

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. A method of sorting related searches on Internet, wherein the method comprises:

obtaining, by a computer via the Internet, a query and obtaining related searches corresponding to the query on the Internet;

determining, by the computer, estimated click rates of the related searches respectively according to a click estimating model obtained from pre-training, wherein the determining includes considering a user behavior feature as input of the click estimating model to obtain an estimated click rate of a related search output by the click estimating model;

sending, by the computer, the estimated click rates of the related searches from a first processing subunit to a second processing subunit to respectively determine guiding capability scores of the related searches according to the estimated click rates and guiding capability features of the related searches;

sorting, by the computer, the related searches based on the estimated click rates that are determined according to the click estimating model, wherein the sorting of the related searches based on the estimated click rates comprises:

sorting, by a sorting subunit of the computer, all related searches in a descending order according to the guiding capability scores, wherein the respective determination of the guiding capability scores of the related searches according to the estimated click rates and the guiding capability features of the related searches comprises:

during user's searching on the computer, performing, by the second processing subunit of the computer, following operation for each related search of the related searches:

respectively obtaining click times of the related searches displayed on the computer within a recent predetermined time length after the user clicks the related search, adding up the click times, dividing a sum by times of displaying the related searches within the recent predetermined time length after the related search is clicked, to obtain a guiding capability feature of the related search;

obtaining a click rate of the related search within the recent predetermined time length; and calculating a product of the guiding capability feature of the related search and the click rate of the related search within the recent predetermined time length, and adding up the product with an estimated click rate of the related search after having gone through normalization processing to obtain a guiding capability score of the related search; and after sorting all the related searches in the descending order according to the guiding capability scores and the estimated click rates to improve accuracy of the sorting of all the related searches, displaying, by the computer, top N related searches in a search result page, and recommending the displayed top N related searches to a user, the N is a positive integer.

2. The method according to claim 1, wherein the determining estimated click rates of the related searches respectively according to a click estimating model obtained from pre-training comprises:

for each related search, obtaining a user behavior feature of the related search respectively.

3. The method according to claim 2, wherein the user behavior feature comprises: co-occurrence feature, quality control feature, click feature and semantic feature.

4. The method according to claim 1, wherein the respectively determining quality scores of related searches according to quality features of related searches comprises:

as for each related search, determining quality score of the related search in a fitting manner respectively according to the quality control feature, guiding capability feature and estimated click rate of the related search.

5. A device for sorting related searches on Internet, comprising:

at least one processor of a computer; and a memory storing instructions, which when executed by the at least one processor, cause the at least one processor to perform operations, the operations comprising:

obtaining, via the Internet, a query and obtaining related searches corresponding to the query on the Internet;

determining estimated click rates of the related searches respectively according to a click estimating model obtained from pre-training, wherein the determining includes considering an obtained user behavior feature as input of the click estimating model to obtain an estimated click rate of a related search output by the click estimating model;

sending the estimated click rates of the related searches from a first processing subunit to a second processing subunit to respectively determine guiding capability scores of the related searches according to the estimated click rates and guiding capability features of the related searches;

sorting the related searches based on the estimated click rates that are determined according to the click estimating model, wherein the sorting of the related searches based on the estimated click rates comprises:

sorting, by a sorting subunit of the computer, all the related searches in a descending order according to the guiding capability scores, wherein the respective determination of the guiding capability scores of the related searches according to the estimated click rates and the guiding capability features of the related searches comprises:

during a user's searching, performing, by the second processing subunit of the computer, following operation for each related search of the related searches:

respectively obtaining click times of the related searches displayed within a recent predetermined time length after the user clicks the related search, adding up the click times, dividing a sum by times of displaying the related searches within the recent predetermined time length after the related search is clicked, to obtain a guiding capability feature of the related search;

obtaining a click rate of the related search within the recent predetermined time length; and calculating a product of the guiding capability feature of the related search and the click rate of the related search within the recent predetermined time length, and adding up the product with the estimated click rate of the related search after having gone through normalization processing to obtain a guiding capability score of the related search; and after sorting all the related searches in the descending order according to the guiding capability scores and the estimated click rates to improve accuracy of the sorting of all the related searches, displaying, by the computer, top N related searches in a search result page, and recommending the displayed top N related searches to a user, the N is a positive integer.

6. The device according to claim 5, wherein the determining estimated click rates of the related searches respectively according to a click estimating model obtained from pre-training comprises:

for each related search, obtaining a user behavior feature of the related search respectively.

7. The device according to claim 6, wherein the user behavior feature comprises: co-occurrence feature, quality control feature, click feature and semantic feature.

8. The device according to claim 5, wherein the respectively determining quality scores of related searches according to quality features of related searches comprises:

as for each related search, determining the quality score of the related search in a fitting manner respectively according to the quality control feature, guiding capability feature and estimated click rate of the related search.

9. A non-transitory computer storage medium, wherein the computer storage medium is coded with a computer program, and when the program is executed by one or more computers, the one or more computers perform following operation:

obtaining, by the one or more computers via Internet, a query and obtaining related searches corresponding to the query on the internet;

determining, by the one or more computers, estimated click rates of the related searches respectively according to a click estimating model obtained from pre-training, wherein the determining includes considering an obtained user behavior feature as input of the click estimating model to obtain an estimated click rate of a related search output by the click estimating model;

sending, by the one or more computers, the estimated click rates of the related searches from a first processing subunit to a second processing subunit to respectively determine guiding capability scores of the related searches according to the estimated click rates and guiding capability features of the related searches;

sorting, by the one or more computers, the related searches based on the estimated click rates that are determined according to the click estimating model, wherein the sorting of the related searches based on the estimated click rates comprises:

sorting, by a sorting subunit of the one or more computers, all related searches in a descending order according to the guiding capability scores, wherein the respective determination of the guiding capability scores of the related searches according to the estimated click rates and the guiding capability features of the related searches comprises:

during user's searching on the one or more computers, performing, by the second processing subunit of the computer, following operation for each related search of the related searches:

respectively obtaining click times of the related searches displayed on the one or more computers within a recent predetermined time length after the user clicks the related search, adding up the click times, dividing a sum by times of displaying the related searches within recent predetermined time length after the related search is clicked, to obtain a guiding capability feature of the related search;

obtaining a click rate of the related search within the recent predetermined time length; and calculating a product of the guiding capability feature of the related search and the click rate of the related search within the recent predetermined time length, and adding up the product with the estimated click rate of the related search after having gone through normalization processing to obtain a guiding capability score of the related search; and after sorting all the related searches in the descending order according to the guiding capability scores and the estimated click rates to improve accuracy of the sorting of all the related searches, displaying, by the computer, top N related searches in a search result page, and recommending the displayed top N related searches to a user, the N is a positive integer.

10. The non-transitory computer storage medium according to claim 9, wherein, the determining estimated click rates of the related searches respectively according to a click estimating model obtained from pre-training comprises:

for each related search, obtaining a user behavior feature of the related search respectively.

11. The non-transitory computer storage medium according to claim 10, wherein the user behavior feature comprises: co-occurrence feature, quality control feature, click feature and semantic feature.

12. The non-transitory computer storage medium according to claim 9, wherein the operation of respectively determining quality scores of related searches according to quality features of related searches comprises:

as for each related search, determining quality score of the related search in a fitting manner respectively according to the quality control feature, guiding capability feature and estimated click rate of the related search.

* * * * *